United States Patent
Yao

(10) Patent No.: US 7,083,330 B1
(45) Date of Patent: Aug. 1, 2006

(54) EAR THERMOMETER HAVING BREAKABLE EAR CAP

(75) Inventor: Shih-Tang Yao, Changhua Hsien (TW)

(73) Assignee: Huang Hua Co., Ltd., Shen Gang Hsiang (TW)

( * ) Notice: Subject to any disclaimer, the term of this patent is extended or adjusted under 35 U.S.C. 154(b) by 0 days.

(21) Appl. No.: 10/968,513

(22) Filed: Oct. 19, 2004

(51) Int. Cl.
*G01K 1/08* (2006.01)
*A61B 6/00* (2006.01)

(52) U.S. Cl. .................. 374/209; 374/158; 600/474
(58) Field of Classification Search ............... 374/209, 374/158; 600/474
See application file for complete search history.

(56) References Cited

U.S. PATENT DOCUMENTS

| | | | | |
|---|---|---|---|---|
| 3,878,836 A | * | 4/1975 | Twentier | 374/158 |
| 4,662,360 A | * | 5/1987 | O'Hara et al. | 374/158 |
| 4,863,281 A | * | 9/1989 | Suszynski | 374/209 |
| 4,911,559 A | * | 3/1990 | Meyst et al. | 374/209 |
| 5,018,872 A | * | 5/1991 | Suszynski et al. | 374/209 |
| 5,293,862 A | * | 3/1994 | O'Hara et al. | 374/158 |
| 5,411,032 A | * | 5/1995 | Esseff et al. | 600/549 |
| 5,487,607 A | * | 1/1996 | Makita et al. | 374/209 |
| 5,645,350 A | * | 7/1997 | Jang | 374/209 |
| 6,097,979 A | * | 8/2000 | Janotte | 600/474 |
| 6,123,454 A | * | 9/2000 | Canfield et al. | 374/209 |
| 6,219,573 B1 | * | 4/2001 | Pompei | 600/474 |
| 6,224,256 B1 | * | 5/2001 | Bala | 374/158 |
| 6,292,685 B1 | * | 9/2001 | Pompei | 600/474 |
| 6,332,090 B1 | * | 12/2001 | DeFrank et al. | 374/209 |
| 6,789,936 B1 | * | 9/2004 | Kraus et al. | 374/209 |
| 6,945,936 B1 | * | 9/2005 | Kerr | 374/209 |
| 2003/0067958 A1 | * | 4/2003 | Jang | 374/158 |
| 2004/0240516 A1 | * | 12/2004 | Harr | 374/121 |

* cited by examiner

*Primary Examiner*—Diego Gutierrez
*Assistant Examiner*—Stanley J. Pruchnic, Jr.
(74) *Attorney, Agent, or Firm*—Alan D. Kamrath; Nikolai & Mersereau, P.A.

(57) ABSTRACT

An ear thermometer includes a main body having a side provided with a sensing head, and a disposable ear cap removably mounted on the sensing head of the main body and having a periphery provided with a pull tab having a root portion formed with a breakable slit connected to the periphery of the ear cap. Thus, the ear cap is broken from the breakable slit of the pull tab, so that the ear cap is broken completely and cannot be reused by a person intentionally, thereby assuring the safe use of the ear cap without incurring a sanitary problem.

9 Claims, 6 Drawing Sheets

EAR THERMOMETER HAVING BREAKABLE EAR CAP

BACKGROUND OF THE INVENTION

1. Field of the Invention

The present invention relates to an ear thermometer, and more particularly to an ear thermometer having a disposable and breakable ear cap.

2. Description of the Related Art

A conventional ear thermometer in accordance with the prior art shown in FIG. 7 comprises a main body 10 having a side provided with a sensing head 11, and a disposable ear cap 20 removably mounted on the sensing head 11 of the main body 10. The sensing head 11 of the main body 10 has an outer wall formed with a semi-circular press rib 12, and the ear cap 20 has an inner wall formed with an annular retaining groove 21 detachably locked on the press rib 12 of the sensing head 111 of the main body 10, so that the ear cap 20 is detachably secured on the sensing head 31 of the main body 30.

However, when the ear cap 20 is removed from the sensing head 31 of the main body 30 after use, the ear cap 20 is not broken easily, so that the ear cap 20 may be reused by a person intentionally, thereby incurring a sanitary problem. In addition, the ear cap 20 is secured on the sensing head 31 of the main body 30 closely, so that the ear cap 20 cannot be detached from the sensing head 31 of the main body 30 easily, thereby causing inconvenience to a user in detaching the ear cap 20.

SUMMARY OF THE INVENTION

In accordance with the present invention, there is provided an ear thermometer, comprising:

a main body having a side provided with a sensing head; and a disposable ear cap removably mounted on the sensing head of the main body and having a periphery provided with a pull tab having a root portion formed with a breakable slit connected to the periphery of the ear cap.

The primary objective of the present invention is to provide an ear thermometer having a disposable and breakable ear cap.

Another objective of the present invention is to provide an ear thermometer, wherein the ear cap is broken from the breakable slit of the pull tab, so that the ear cap is broken completely and cannot be reused by a person intentionally, thereby assuring the safe use of the ear cap without incurring a sanitary problem.

A further objective of the present invention is to provide an ear thermometer, wherein the pull tab of the ear cap is pulled outward after use of the ear cap, so that the breakable slit of the pull tab of the ear cap is torn and broken to form an elongated broken slit on the ear cap, thereby facilitating a user detaching the ear cap from the sensing head of the main body.

A further objective of the present invention is to provide an ear thermometer, wherein the ear cap is fixed on the sensing head of the main body by rotation of the ear cap relative to the sensing head of the main body, thereby facilitating the user mounting the ear cap on the sensing head of the main body and detaching the ear cap from the sensing head of the main body.

Further benefits and advantages of the present invention will become apparent after a careful reading of the detailed description with appropriate reference to the accompanying drawings.

DETAILED DESCRIPTION OF THE INVENTION

Figure 1:
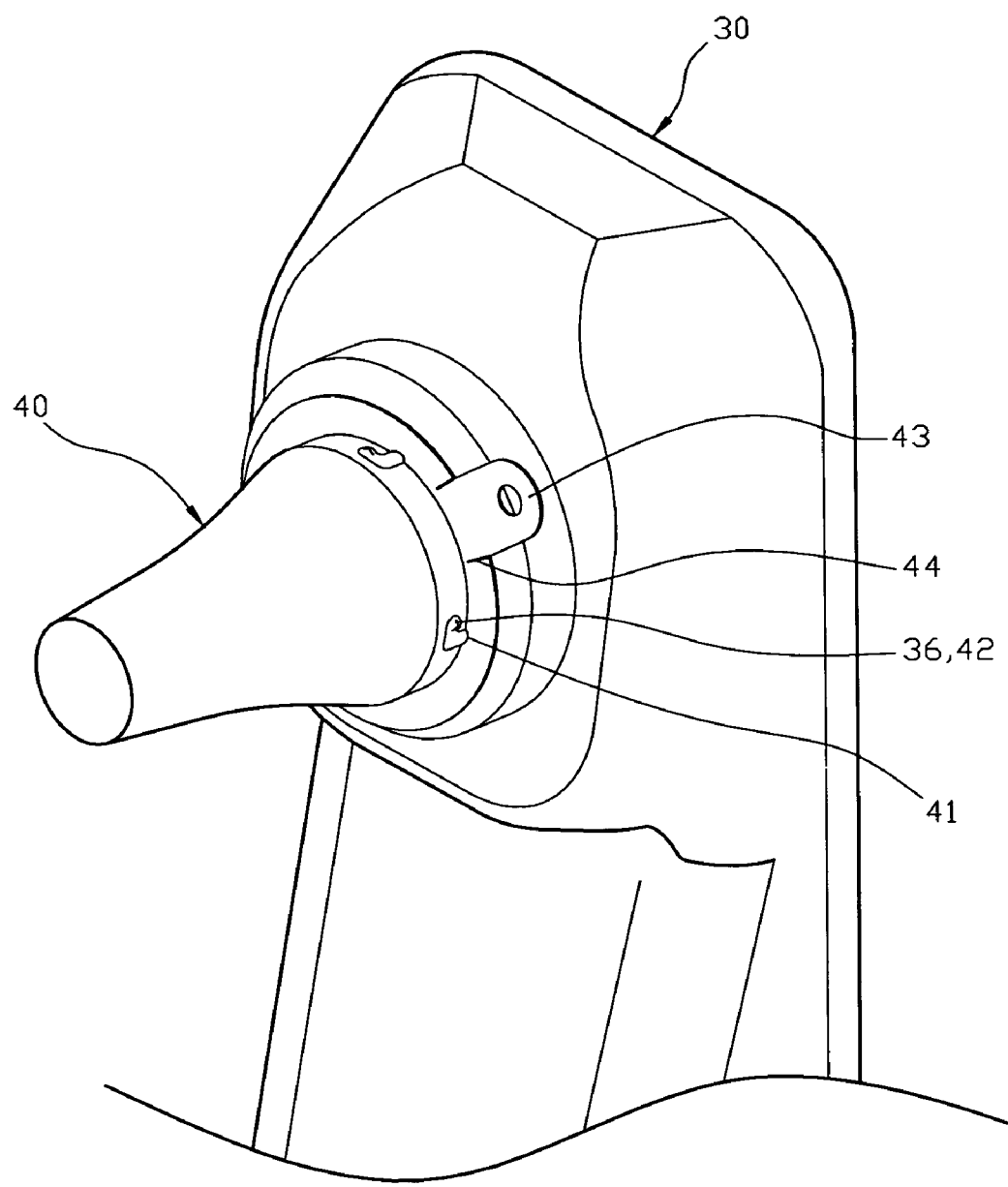
FIG. 1 is a partially cut-away perspective view of an ear thermometer in accordance with the preferred embodiment of the present invention.
Figure 2:
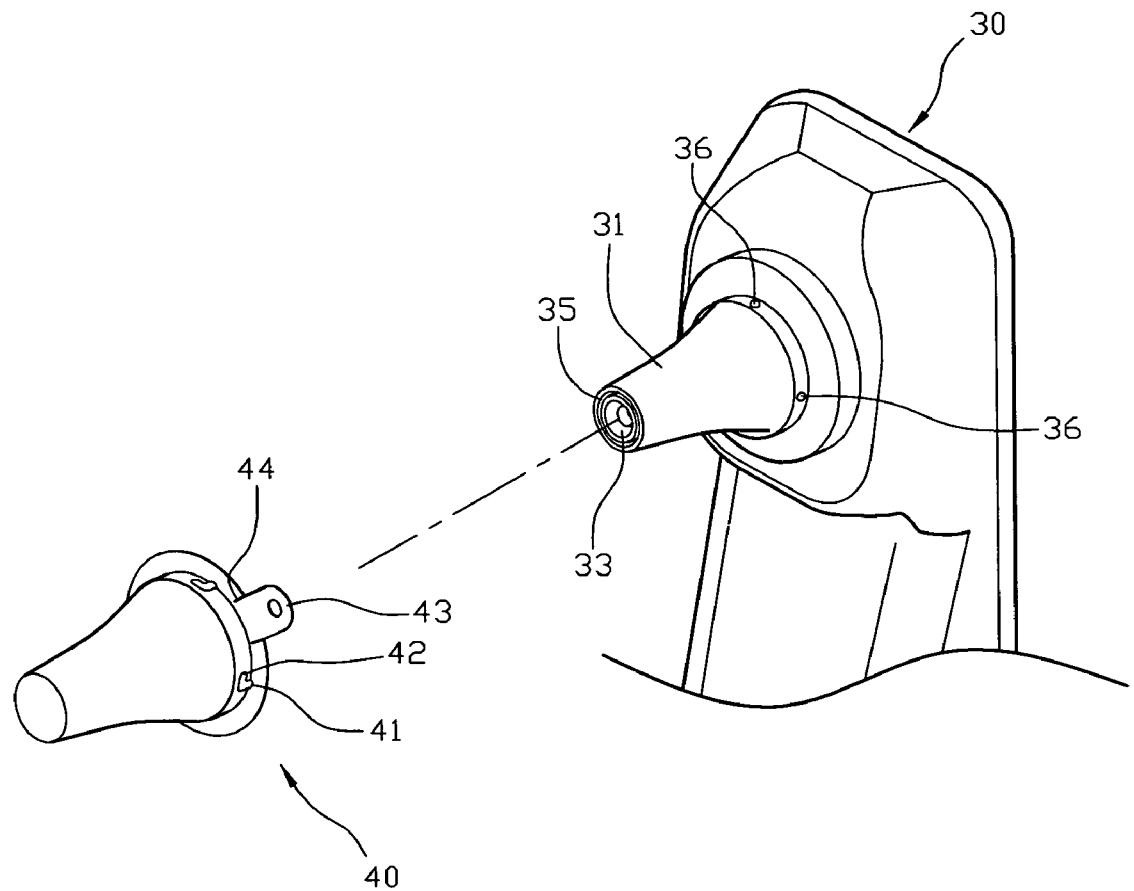
FIG. 2 is an exploded perspective view of the ear thermometer as shown in FIG. 1.
Figure 3:
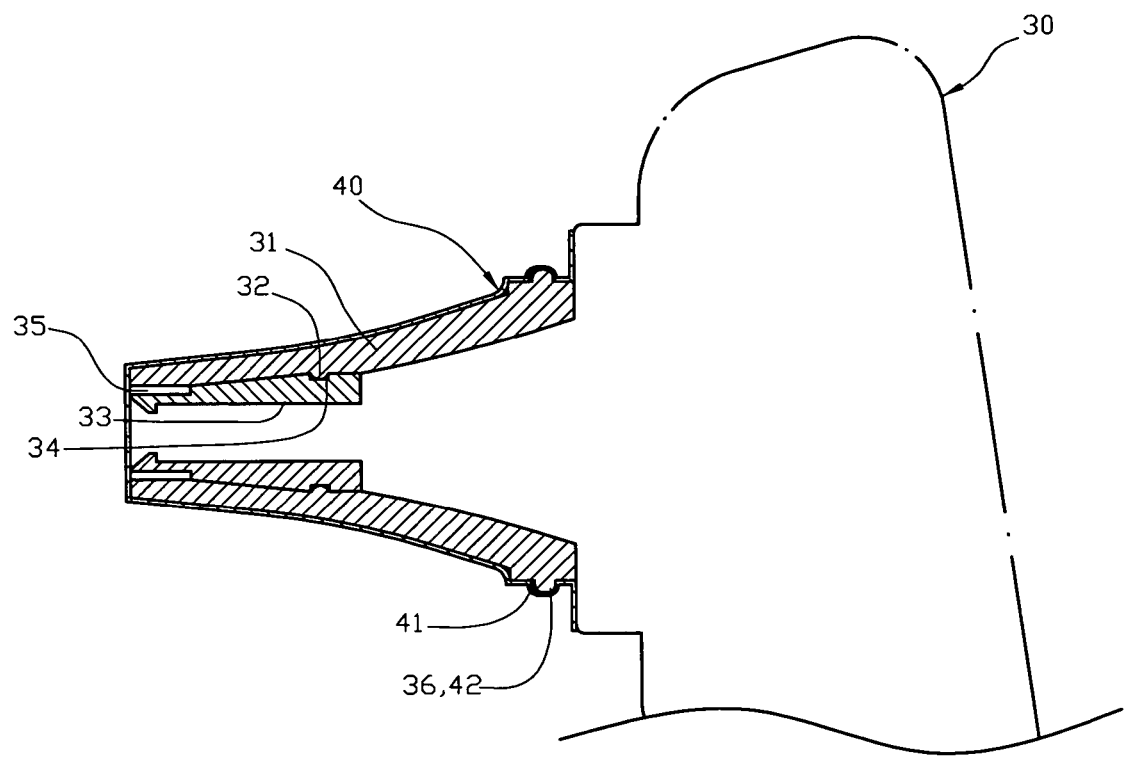
FIG. 3 is a side plan cross-sectional view of the ear thermometer as shown in FIG. 1.

Referring to the drawings and initially to FIGS. 1–5, an ear thermometer in accordance with the preferred embodiment of the present invention comprises a main body 30 having a side provided with a sensing head 31, and a disposable ear cap 40 removably mounted on the sensing head 31 of the main body 30 and having a periphery provided with a pull tab 43 having a root portion formed with a breakable slit 44 connected to the periphery of the ear cap 40.

The ear thermometer further comprises a sensor 33 mounted in the sensing head 31 of the main body 30 and having an outer wall formed with an annular retaining groove 34. The sensing head 31 of the main body 30 has an inner wall formed with an annular retaining rib 32 locked in the retaining groove 34 of the sensor 33, so that the sensor 33 is secured in the sensing head 31 of the main body 30. The outer wall of the sensor 33 has a distal end formed with an annular insulating space 35 located between the sensor 33 and the sensing head 31 of the main body 30 to provide a heat insulating effect.

The sensing head 31 of the main body 30 has a periphery provided with a plurality of locking bosses 36, and the ear cap 40 has a peripheral wall formed with a plurality of substantially L-shaped locking slots 41 each detachably locked on a respective one of the locking bosses 36 of the sensing head 31 of the main body 30, so that the ear cap 40 is detachably secured on the sensing head 31 of the main body 30.

Each of the locking slots 41 of the ear cap 40 has a distal end formed with a substantially arcuate positioning recess 42 (see FIG. 4) for positioning a respective one of the locking bosses 36 of the sensing head 31 of the main body 30. Preferably, each of the locking slots 41 of the ear cap 40 has a first section in line with a respective one of the locking bosses 36 of the sensing head 31 of the main body 30 and a second section perpendicular to the first section and formed with the positioning recess 42.

Figure 5:
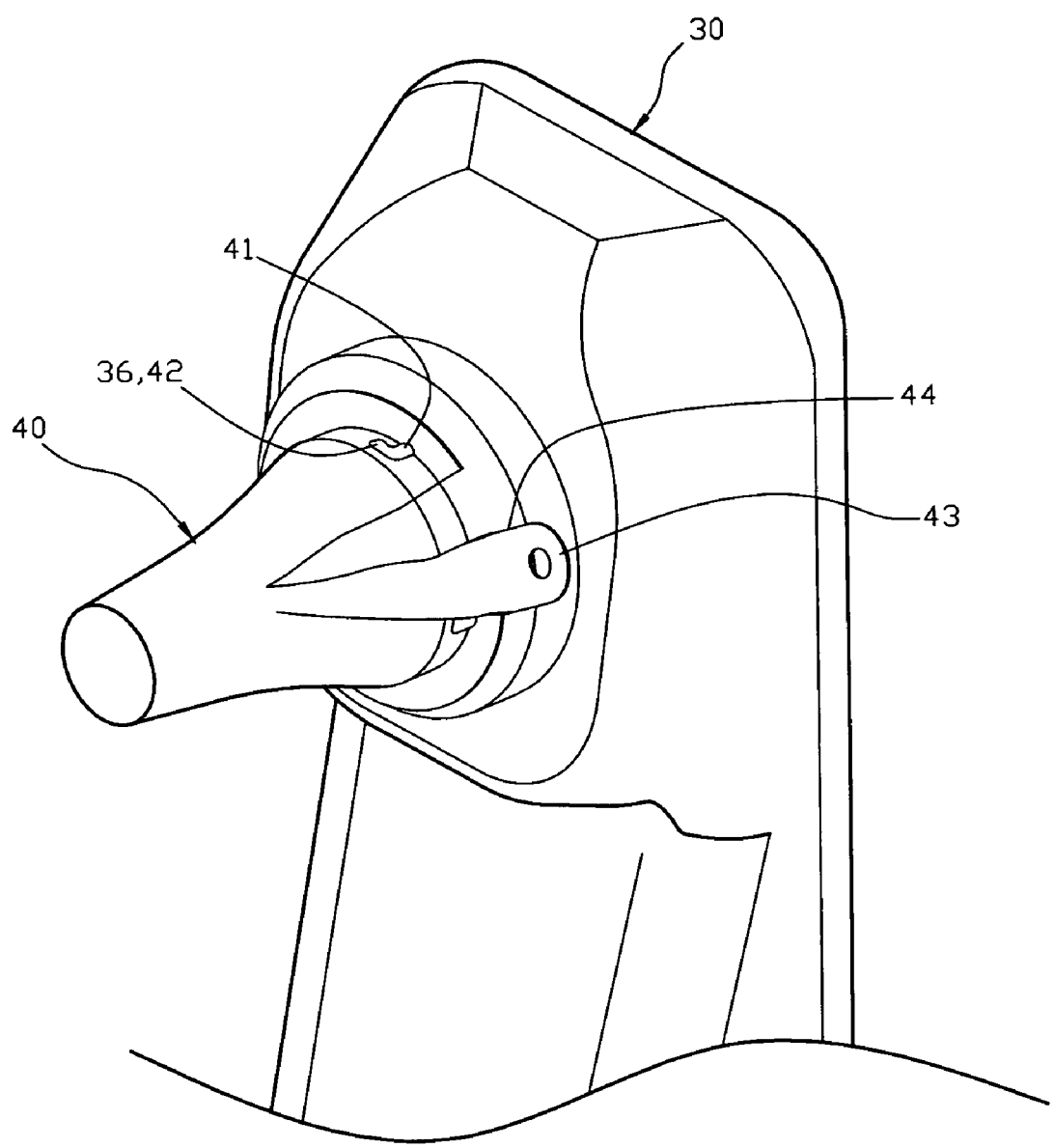
FIG. 5 is a schematic operational view of the ear thermometer as shown in FIG. 1.

The breakable slit 44 of the pull tab 43 of the ear cap 40 is axially extended from the periphery of the ear cap 40 inward along a longitudinal axis of the ear cap 40 as shown in FIG. 5.

Figure 4:
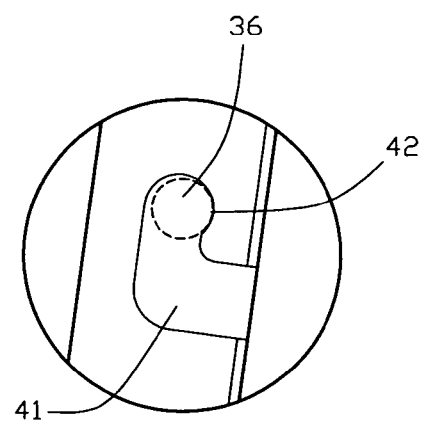
FIG. 4 is a partially enlarged top plan view of the ear thermometer as shown in FIG. 1.

When in use, when the ear cap 40 is mounted on the sensing head 31 of the main body 30, each of the locking slots 41 of the ear cap 40 is mounted on a respective one of the locking bosses 36 of the sensing head 31 of the main body 30. Then, the ear cap 40 is rotated relative to the sensing head 31 of the main body 30 through a determined angle, so that each of the locking bosses 36 of the sensing head 31 of the main body 30 is inserted into and locked in the positioning recess 42 of a respective one of the locking slots 41 of the ear cap 40 as shown in FIG. 4, thereby fixing the ear cap 40 on the sensing head 31 of the main body 30 as shown in FIG. 1.

After use of the ear cap 40, the pull tab 43 of the ear cap 40 is pulled outward, so that the breakable slit 44 of the pull tab 43 of the ear cap 40 is torn and broken to form an elongated broken slit on the ear cap 40 as shown in FIG. 5, thereby facilitating a user detaching the ear cap 40 from the sensing head 31 of the main body 30. In such a manner, the ear cap 40 is broken from the breakable slit 44 of the pull tab 43, so that the ear cap 40 is broken completely and cannot be reused by a person intentionally, thereby assuring the safe use of the ear cap 40 without incurring a sanitary problem.

Accordingly, the ear cap 40 is broken from the breakable slit 44 of the pull tab 43, so that the ear cap 40 is broken completely and cannot be reused by a person intentionally, thereby assuring the safe use of the ear cap 40 without incurring a sanitary problem. In addition, the pull tab 43 of the ear cap 40 is pulled outward after use of the ear cap 40, so that the breakable slit 44 of the pull tab 43 of the ear cap 40 is torn and broken to form an elongated broken slit on the ear cap 40, thereby facilitating a user detaching the ear cap 40 from the sensing head 31 of the main body 30. Further, the ear cap 40 is fixed on the sensing head 31 of the main body 30 by rotation of the ear cap 40 relative to the sensing head 31 of the main body 30, thereby facilitating the user mounting the ear cap 40 on the sensing head 31 of the main body 30 and detaching the ear cap 40 from the sensing head 31 of the main body 30.

Figure 6:
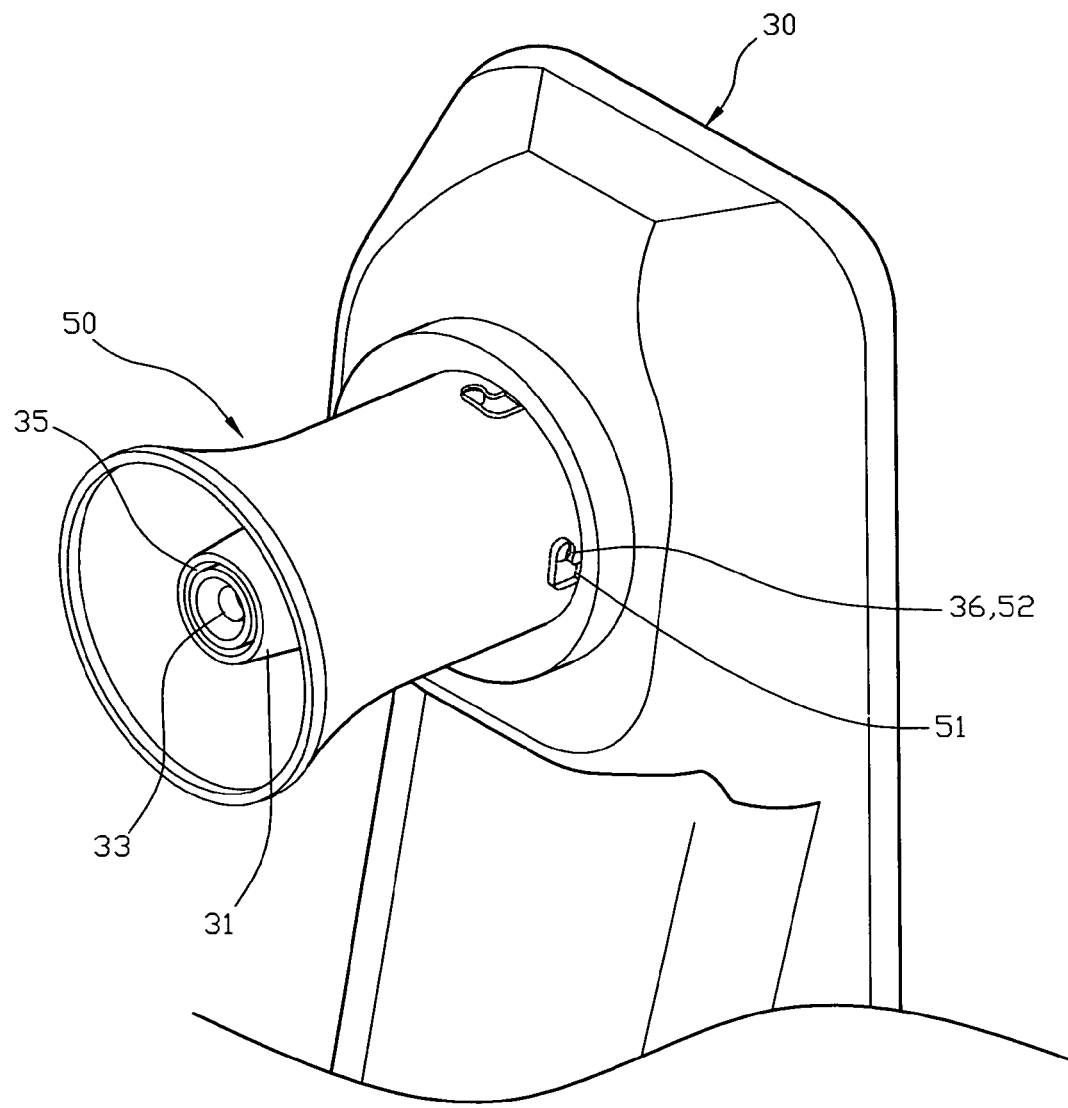
FIG. 6 is a partially cut-away perspective view of an ear thermometer in accordance with another embodiment of the present invention.
Figure 7:
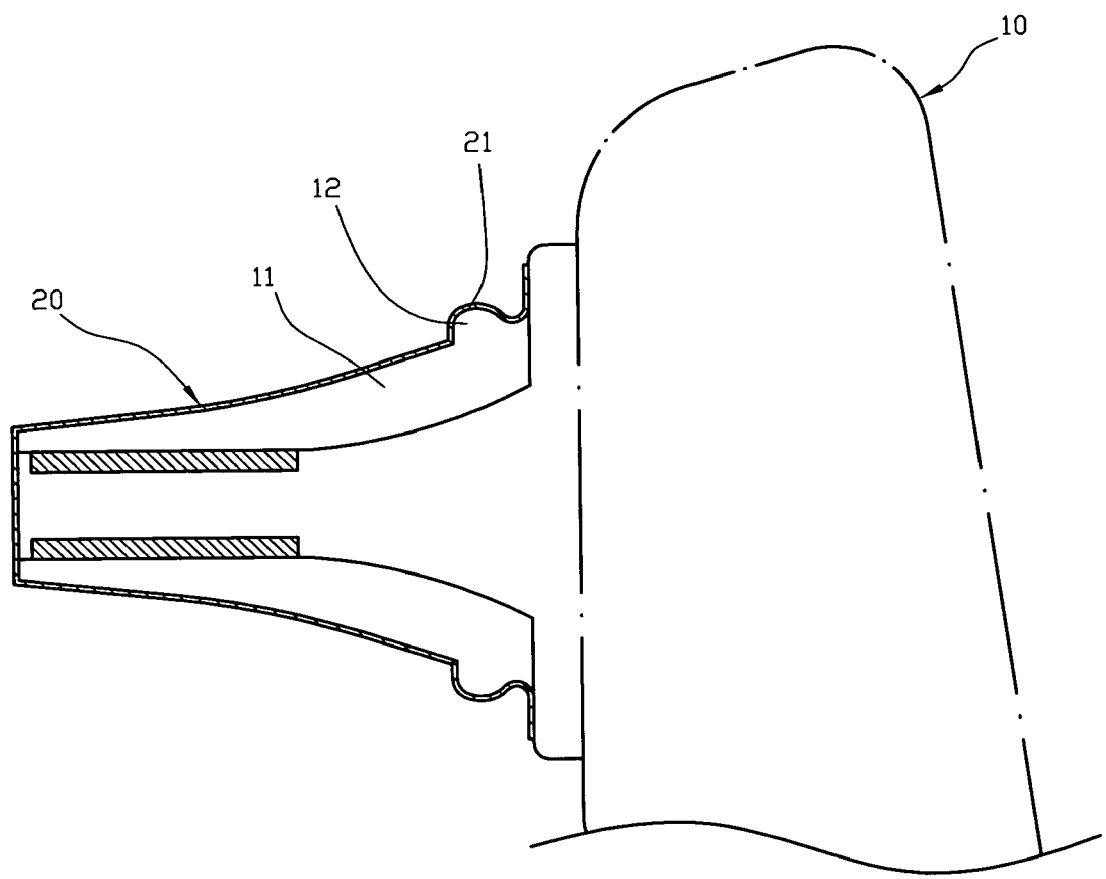
FIG. 7 is a side plan cross-sectional view of a conventional ear thermometer in accordance with the prior art.

As shown in FIG. 6, the ear thermometer further comprises a disposable forehead cap 50 removably mounted on the sensing head 31 of the main body 30 and having a peripheral wall formed with a plurality of substantially L-shaped locking slots 51 each detachably locked on a respective one of the locking bosses 36 of the sensing head 31 of the main body 30, so that the forehead cap 50 is detachably secured on the sensing head 31 of the main body 30. Each of the locking slots 51 of the forehead cap 50 has a distal end formed with a substantially arcuate positioning recess 52 for positioning a respective one of the locking bosses 36 of the sensing head 31 of the main body 30. Preferably, each of the locking slots 51 of the forehead cap 50 has a first section in line with a respective one of the locking bosses 36 of the sensing head 31 of the main body 30 and a second section perpendicular to the first section and formed with the positioning recess 52.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An ear thermometer, comprising:
   a main body having a side provided with a sensing head; and
   a disposable ear cap removably mounted on the sensing head of the main body and the ear cap having a periphery provided with a pull tab, the pull tab of the ear cap having a root portion, the root portion of the pull tab being formed with a breakable slit, the breakable slit being connected to the periphery of the ear cap;
   wherein the sensing head of the main body has a periphery provided with a plurality of locking bosses, and the ear cap has a peripheral wall formed with a plurality of substantially L-shaped locking slots each detachably locked on a respective one of the locking bosses of the sensing head of the main body, so that the ear cap is detachably secured on the sensing head of the main body.

2. The ear thermometer in accordance with claim 1, wherein the breakable slit of the pull tab of the ear cap is axially extended from the periphery of the ear cap inward along a longitudinal axis of the ear cap.

3. The ear thermometer in accordance with claim 1, wherein each of the locking slots of the ear cap has a distal end formed with a substantially arcuate positioning recess for positioning a respective one of the locking bosses of the sensing head of the main body.

4. The ear thermometer in accordance with claim 3, wherein the ear cap is rotated relative to the sensing head of the main body, so that each of the locking bosses of the sensing head of the main body is inserted into and locked in the positioning recess of a respective one of the locking slots of the ear cap, thereby fixing the ear cap on the sensing head of the main body.

5. The ear thermometer in accordance with claim 1, wherein each of the locking slots of the ear cap has a first section in line with a respective one of the locking bosses of the sensing head of the main body and a second section perpendicular to the first section and formed with a positioning recess.

6. The ear thermometer in accordance with claim 1, wherein the pull tab of the ear cap is pulled outward, so that the breakable slit of the pull tab of the ear cap is torn and broken to form an elongated broken slit on the ear cap, thereby facilitating a user detaching the ear cap from the sensing head of the main body.

7. An ear thermometer, comprising:
   a main body having a side provided with a sensing head; and
   a disposable ear cap removably mounted on the sensing head of the main body and the ear cap having a periphery provided with a pull tab, the pull tab of the ear cap having a root portion, the root portion of the pull tab being formed with a breakable slit, the breakable slit being connected to the periphery of the ear cap;
   wherein the sensing head of the main body has a periphery provided with a plurality of locking bosses, and the ear thermometer further comprises a disposable forehead cap removably mounted on the sensing head of the main body and the forehead cap having a peripheral wall formed with a plurality of substantially L-shaped locking slots each detachably locked on a respective one of the locking bosses of the sensing head of the main body, so that the forehead cap is detachably secured on the sensing head of the main body.

8. The ear thermometer in accordance with claim 7, wherein each of the locking slots of the forehead cap has a distal end formed with a substantially arcuate positioning recess for positioning said slot in a respective one of the locking bosses of the sensing head of the main body.

9. The ear thermometer in accordance with claim 8, wherein each of the locking slots of the forehead cap has a first section in line with a respective one of the locking bosses of the sensing head of the main body and a second section perpendicular to the first section and formed with the positioning recess.

* * * * *